UNITED STATES PATENT OFFICE.

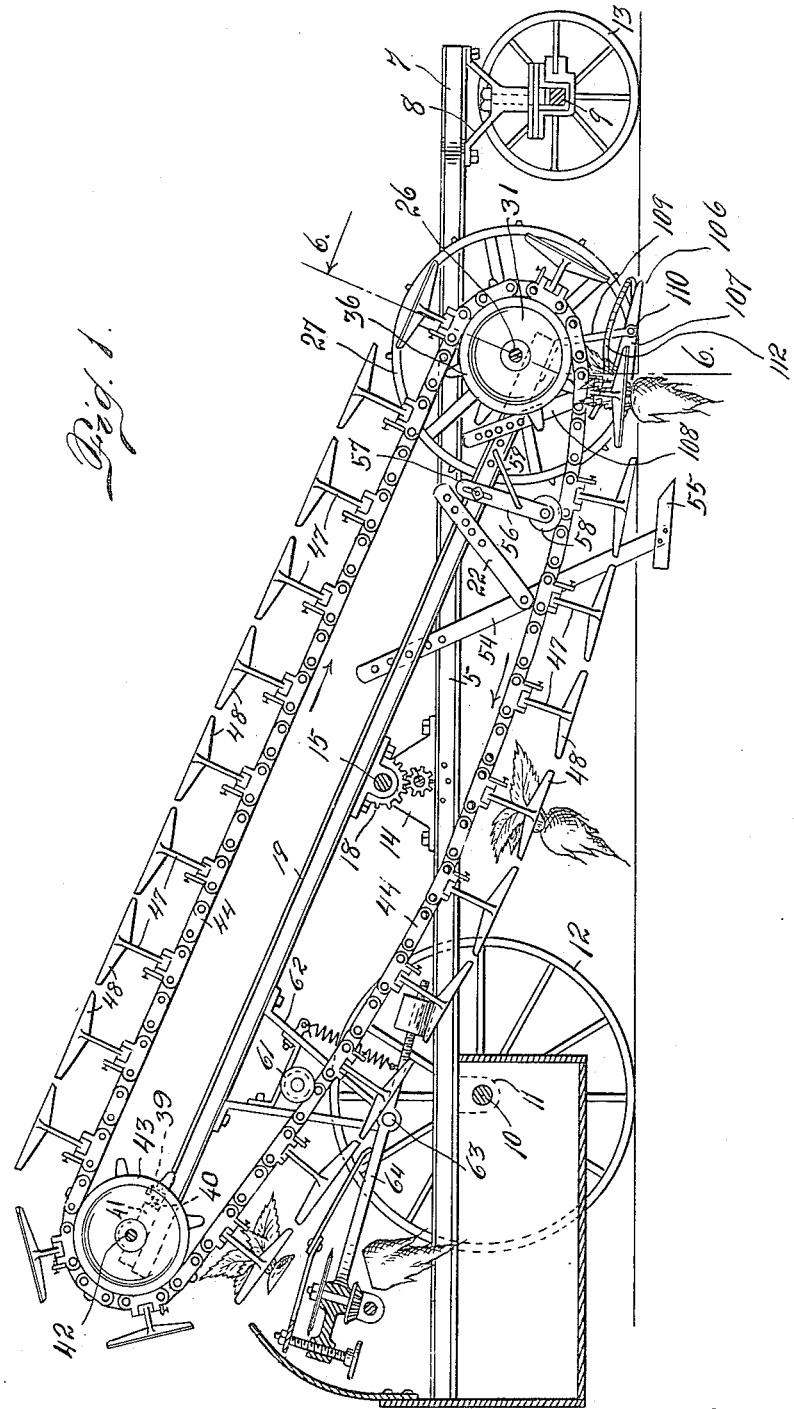

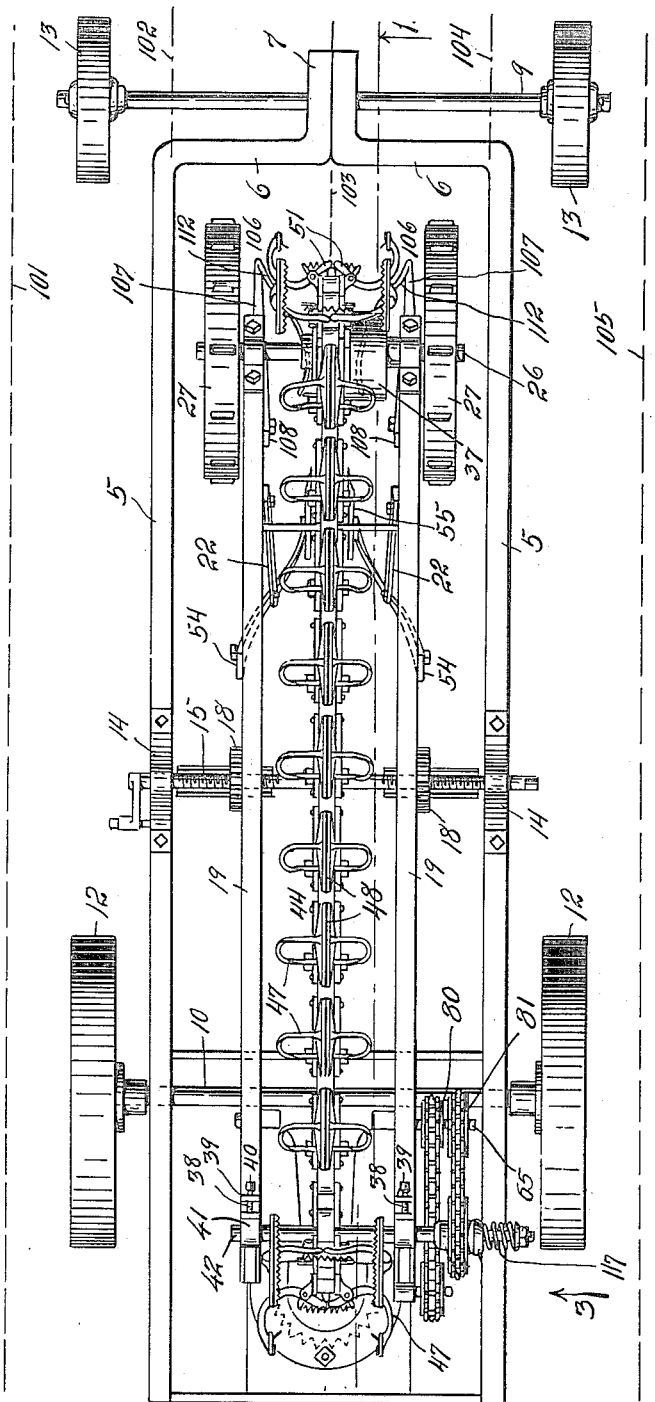

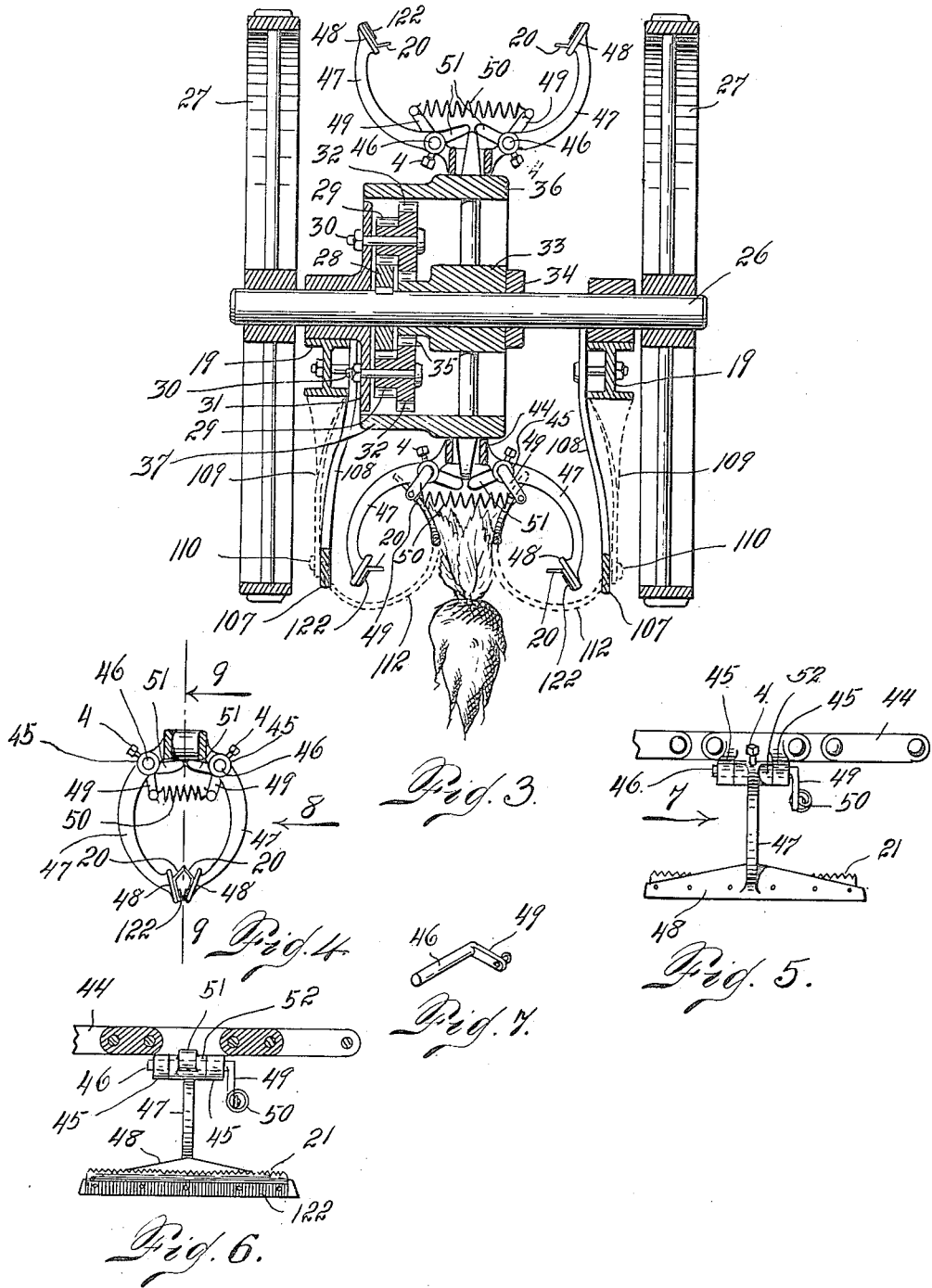

GEORGE B. HAYES AND WALTER A. HAYES, OF DENVER, COLORADO.

BEET-HARVESTING MACHINE.

1,294,801.     Specification of Letters Patent.      Patented Feb. 18, 1919.

Application filed December 27, 1915. Serial No. 68,604.

*To all whom it may concern:*

Be it known that we, GEORGE B. HAYES and WALTER A. HAYES, citizens of the United States, residing at the city and county of Denver and State of Colorado, have invented certain new and useful Improvements in Beet-Harvesting Machines; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in machines for harvesting beets, and our present application relates more particularly to the mechanism for grasping their foilage, pulling them out of the ground and conveying them to a cutter which removes the tops.

The means for grasping the foliage of the beets consist of an endless traveling member upon which are mounted and suitable spaced independently operating grasping devices, each device consisting of two parts or members spring actuated to grasp the beet top or foliage, the two parts of each grasping device being automatically opened in opposition to their spring through the instrumentality of sprocket wheels which engage the endless traveling member at the opposite extremities of the machine, the teeth of these wheels being of sufficient length, to act upon relatively short crank arms with which the parts of each grasping device are provided, in such a manner as to separate the grasping extremities of the two parts preparatory to grasping the foliage of any beet. Again, after the beet has been carried by one of these grasping devices to the cutter and its top or foilage removed, a sprocket wheel located at the opposite extremity of the machine from the one first named, acts in a similar manner to open the parts of the grasping device whereby the foliage is released.

The lower run of the endless traveling chain carrying the grasping devices, moves in a direction reverse to the travel of the machine, and coöperates with dirt loosening members rigidly mounted on the framework of the machine, the dirt loosening devices serving to break up the ground around the beets whereby the latter are easily removed from the earth through the agency of the grasping devices which close upon their tops as heretofore indicated. Provision is made for imparting to the endless traveling foliage grasping member, a sufficient degree of travel as compared with the travel of the machine, to enable it to properly perform the aforesaid function. It will be understood that in order that the rearwardly traveling run of the endless grasping member may act to remove the beets from the ground by grasping their foliage, this endless device must travel at the same speed on its own account or independently of the bodily travel of the machine, that the machine itself travels over the ground. This movement of the endless traveling member is imparted from traction wheels and through the medium of speed increasing gears.

Having briefly outlined our improved construction, we will proceed to describe the same in detail, reference being made to the accompanying drawing, in which is illustrated an embodiment thereof.

In this drawing,—

Figure 1 is a vertical longitudinal section of the machine.

Fig. 2 is a top plan view of the same.

Fig. 3 is a sectional view taken on the line 6—6, Fig. 1, looking in the direction of the arrow.

Fig. 4 is a side elevational detail of one pair of grasping jaws, being a view looking in the direction of arrow 7, Fig. 5.

Fig. 5 is a detail view of a portion of the carrier chain, showing one of the grasping jaws mounted thereon, being a view looking in the direction of arrow 8, Fig. 4.

Fig. 6 is a section taken on the line 9—9, Fig. 4, looking toward the left.

Fig. 7 is a perspective view of a crank spindle or rock shaft forming a part of each grasping device.

The same reference characters indicate the same parts in all the views.

Let the numeral 5 indicate horizontal members forming a main frame of the machine, these members having inwardly bent portions 6 meeting at the middle of the front end of the machine and bent thence forwardly to form the portions 7 to which is bolted a downwardly extending bracket 8 to which is swiveled the front axle 9. A rear axle 10 is mounted in suitable journal boxes 11 secured to the side members 5 of the frame. The axles are supported by ground wheels 12 and 13.

Upon the side members 5 and approximately midway of the frame are mounted blocks 14 forming a support for a shaft 15 upon which is approximately centrally fulcrumed an auxiliary frame composed of bars 19 upon which are mounted the operating devices of the machine.

Across the forward ends of the frame members 19 is rotatably supported a shaft 26 having fixed thereto traction wheels 27. Keyed upon the shaft 26 is a gear wheel 28 arranged to mesh with two gears 29 supported upon pins 30 attached to a plate 31 which is rigidly secured to the auxiliary framework. Gears 32 are integral with the gears 29 and rotate therewith. A sleeve 33 is loosely mounted upon the shaft 26 and prevented from lateral movement in one direction thereon by a collar 34 which is secured to said shaft. Upon the opposite end of the sleeve 33 is formed a gear 35 arranged to mesh with the gears 32. Mounted to rotate with the sleeve 33 is a sprocket wheel 36 having a laterally extending housing portion 37 for inclosing the gearing just described and protecting it against dirt which may cling to the grasping jaws.

Upon the upper ends of the auxiliary frame members 19 are upstanding internally threaded lugs 39 within which are threaded bolts 40 pivotally mounted at their free ends or swiveled in sliding journal boxes 41, within which boxes is journaled a shaft 42 carrying a sprocket wheel 43.

The endless chain 44 is arranged to run upon the sprocket wheels 36 and 43. Fixed upon the side members of certain of the links of the chain 44 are lugs 45 in which are pivotally mounted rock shafts or spindles 46 having curved arms 47 extending outwardly therefrom, the free extremities of the arms 47 being provided with clamping jaws 48 each equipped with an angle member 20 one part of which is toothed to facilitate its holding capacity when the two jaws are brought together upon the foliage of the beet. Integral with the rock shafts 46 and extending inwardly therefrom are short arms 49 to the free extremities of which are connected the opposite ends of a spiral spring 50, this spring being under tension to normally cause the jaws to close. Each jaw or grasping member is provided with an inwardly extending projection 51 which constitutes a short arm of the lever of which each jaw may be said to consist, the fulcrum of the lever in each case being the rock shaft or spindle 46. Each of these lever-like devices is provided with a sort of hub 52 through which the rock shaft 46 passes. Through this hub is passed a set bolt 4 which engages the rock shaft 46 and locks the jaw thereon in the desired position of adjustment. It is evident that by adjusting each jaw or lever-like member upon its fulcrum pin or shaft 46, the tension of the spring 50 may be regulated as desired.

Near the forward extremity of the auxiliary frame are adjustably secured two depending arms 54 supporting at their lower extremities small plows 55 by means of which the earth about the beets is loosened. Each of these arms is provided with a number of perforations to permit any desired degree of adjustment upwardly and downwardly upon the auxiliary frame as circumstances may require. Each arm 54 is further supported by an auxiliary member 22 which is connected with the arm at its lower extremity and with the corresponding frame bar 19 at its upper extremity, this auxiliary part 22 being provided with a number of perforations to facilitate adjustment. Also mounted upon the auxiliary frame is a depending arm 56 which is vertically adjustable by means of a slot 57 through which a suitable fastening device is passed, said device having a nut at one extremity for purposes of adjustment. This member 56 is further supported by a part 59 which is adjustably connected with the auxiliary frame. Upon the lower extremity of the part 56 is mounted a grooved wheel 58 through the medium of which the endless chain carrying the grasping devices may be made to assume any desired or suitable inclination for the proper operation of the machine in pulling the beets. A second grooved pulley 61 is supported upon V-shaped brackets 62 near the rear end of the auxiliary frame for preventing any side motion of the chain at this point.

From the foregoing description it is believed that the operation of our improved machine will be readily understood. It should be stated that the machine as illustrated in Figs. 1 and 2 will be drawn toward the right, the horses or other power being connected with the front axle 9 in any suitable manner. The broken lines 101, 102, 103, 104 and 105 indicate the rows of beets.

These rows may be spaced 16, 18 or 20 inches apart according to the richness of the soil in which the beets are planted. In moving the machine through the beet field, it is so guided as to cause the wheels 12 and 13 to pass between the rows to avoid running over the undug rows of beets on one side and in order to run upon firm ground on the side where the beets have been dug.

Now, after the machine has been so positioned the digging and plowing or dirt loosening apparatus is adjusted. The forward portion of the digging and plowing apparatus mounted upon the pivoted auxiliary frame is slightly heavier than the rear portion of the same whereby if the auxiliary frame is permitted to tilt freely upon its pivot, the traction wheels 27 will run upon the ground. Power for all of the operations of the machine is taken from the traction wheels 27. One special object of the pivotal mounting of the auxiliary frame is to permit it to ride freely up and down over obstructions or unevennesses which may be encountered.

As the machine moves over the ground the wheels 27 transmit motion through the gears 28, 29, 32 and 35 to the sprocket wheel 36, increasing the speed of rotation. This is necessary in order that the clamping devices mounted upon the end chain or carrier may properly perform their function. It will be understood that the lower run of this chain travels rearwardly during the operation of the machine and hence must travel fast enough as compared with the bodily forward travel of the machine, to enable it to perform the beet pulling function. As the grasping devices engage the foliage of the beets, the plows 55 move forward and loosen the dirt around the beets thus coöperating with the grasping devices and with the other elements of the machine to enable the latter to perform its function as heretofore outlined.

The grooved pulley 58 is made vertically adjustable in order to cause the clamping jaws to move past the plows 55 at the most desirable height above the latter, this height being different for different varieties of beets.

The opening and closing movements of the clamping jaws 48 it is believed will be understood from an inspection of the drawing, it being apparent that whenever the links of the chain to which the jaws are pivoted ride over the teeth of the sprocket wheels 36 or 43 said teeth will push outwardly upon the crank arms 51 which are rigid with respect to the arms 47, thus spreading the clamping jaws. When this function is performed by the teeth of the wheel 36, the clamping jaws are opened preparatory to grasping the foliage of the beet at the forward end of the machine, the wheel releasing the spreading or open jaws just in time to allow them to close upon the beet top. Again, at the rear end of the machine the teeth of the wheel 43 act to spread the jaws for the purpose of releasing or discharging the top or foliage after it has been severed from the body of the beet by the rotary cutter 69.

As the machine moves forward the beets are raised above the ground. Continued rearward travel of the clamping jaws carries the beet top rearwardly and upwardly until the jaws are spread by engagement with the sprocket wheel 43 as heretofore explained, whereupon the beet top falls upon the guard 91 whence it is directed to the ground in the rear of the machine.

In order that the grasping jaws may engage the foliage of the beet advantageously during the initial grasping act, it is necessary that the foliage which is usually more or less spread out or flattened upon the ground, shall be lifted and gathered whereby it assumes an approximately vertical position. In order to perform this function, we employ gathering devices 106 composed of rigid forwardly extending parallel parts 107 each of which is provided at its rear extremity with an upwardly and rearwardly projecting part 108 which is adjustably secured to one of the auxiliary frame bars 19 somewhat in the rear of the forward extremity of said bar. These parts 107 are further supported by rigid downwardly and forwardly projecting arms 109 whose upper extremities are secured to the forward ends of the bars 19 and whose rear extremities are pivotally connected with the parts 107 as shown at 110. These parts 107 may be adjusted to cause them to slightly penetrate the ground, in order to insure their passing below the foliage of the beets whereby the outer portions of the foliage are raised, the upper edges of the parts 107 being upwardly inclined for the purpose. The parts 107 are further equipped with upwardly, inwardly and rearwardly extending rods 112 which after the foliage is raised by the parts 107, serve to further lift it and at the same time crowd it inwardly, until the foliage is finally confined within a comparatively narrow space between the rear portions of the rods 112. When this condition exists the foliage is also raised to occupy approximately a vertical position (see Figs. 1 and 3), and practically as soon as this occurs, the jaws of the clamping or grasping devices engage the foliage from opposite sides and in opposing relation. It will be understood that as the arms 47 of the grasping devices are outwardly curved, there will be space enough between the two outwardly curved arms 47 to accommodate the gathering rods 112 during the initial grasping act, after which the grasping device will move rearwardly as it then forms a part of the lower run of the endless carrying or conveying chain.

In order to make the closing of the grasping jaws 48 practically noiseless in the event that nothing is between them, we equip their outer edges with cushioning members 122 (see Figs. 4 and 6). These members will engage each other and perform a cushioning function since they make the outer edges of the angle members 20 slightly thicker than the inner uncushioned edges of said members.

It has already been explained that the movement of the endless traveling conveyer on the sprocket wheels 36 and 43, must be the same or approximately the same as the forward travel or bodily travel of the machine upon its ground wheels; and that since the motion is imparted from the traction wheels 27 which are larger than the sprocket wheels, speed increasing gearing mechanism is employed. By virtue of this construction, as soon as the jaws of any grasping device engage the foliage of a beet, these jaws will remain stationary with reference to the beet and the ground in which the beet is embedded so far as any longitudinal travel is concerned, but as the body of the machine moves forwardly over the ground, the grasping device engaging the foliage of the beet in question, gradually rises due to the upward inclination of the lower run of the endless conveyer, hence, the grasping device exerts a pulling force upon the beet in an upward direction only, and the plows 55 simultaneously serve to loosen the earth and coöperate with the grasping device to remove the beet from the ground at the proper time. It is important that this principle of operation of the machine should be borne in mind.

Having thus described our invention, what we claim is:—

1. In a harvesting machine, a sprocket wheel, a chain arranged to run over the said sprocket wheel, clamping jaws pivotally mounted upon said chain and spring actuated to bring the jaws together, and means adapted to be acted upon by the teeth of said sprocket wheel for forcing the jaws apart against the action of their springs.

2. In a harvesting machine, a sprocket wheel, a chain arranged to engage said sprocket wheel, clamping jaws pivotally mounted upon certain of the links of said chain, and spring actuated to bring the jaws together, and means adapted to be acted upon by the teeth of said sprocket wheel for forcing the jaws apart against the action of their springs.

3. In a harvesting machine, a sprocket wheel, a chain arranged to run over said sprocket wheel, clamping jaws pivotally mounted upon the sides of said chain and spring actuated to bring the jaws together, the said jaws being equipped with crank arms extending toward each other and beyond the fulcrums of the jaws, said crank arms being adapted to be acted upon by the teeth of said sprocket wheel to force the jaws apart against the actions of their springs.

4. In a harvesting machine, the combination of a sprocket wheel, a chain arranged to run over the said sprocket wheel, clamping jaws pivotally mounted upon said chain and spring actuated to bring the jaws together, and means on said sprocket wheel for automatically forcing the jaws apart against the action of their springs at predetermined intervals.

5. In a machine of the class described, the combination with a framework, of a chain mounted to travel on said framework and equipped with clamping jaws normally spring held in the closed position, shafts at the opposite extremities of the framework for moving said chain, and means on said shafts for automatically forcing the jaws apart against the action of their springs to enable the jaws to successively perform the foliage grasping and releasing acts.

6. In a machine of the class described, the combination of means for grasping the foliage of a beet at one point and carrying it to a second point, a rotary member, and means on said rotary member for automatically acting on the grasping means to release the foliage when it has reached said second point.

7. The combination of a frame mounted on ground wheels, an endless traveling conveyer mounted on said frame, foliage grasping devices mounted on the conveyer at intervals, rotary means for moving said conveyer, means on said rotary means for automatically actuating said devices to cause them to grasp the foliage of the beet, and means for automatically acting on the grasping devices to cause them to release the beet foliage after the latter has been carried a predetermined distance.

8. The combination of a frame mounted on ground wheels, an endless traveling conveyer mounted on said frame, spring actuated foliage grasping devices mounted upon the conveyer at intervals, rotary means for moving said conveyer, means on said rotary means for automatically actuating said devices to cause them to open preparatory to grasping the beet foliage, and means for automatically acting on the devices to cause them to release the foliage after the latter has been carried a predetermined distance.

9. The combination with a frame mounted on ground wheels, of an endless traveling conveyer mounted on said frame, spring actuated foliage grasping devices mounted upon the conveyer at intervals, rotary means for moving said conveyer, means on said rotary means for automatically actuating said devices to cause them to open preparatory to grasping the beet foliage, and a rotary member carrying means for automatically acting on the devices to cause them to release the foliage after the latter has been carried a predetermined distance.

In testimony whereof we affix our signatures in presence of two witnesses.

GEORGE B. HAYES.
WALTER A. HAYES.

Witnesses:
GRACE HUSTON,
A. EBERT O'BRIEN.